United States Patent
Merritt

[19]

[11] Patent Number: 6,010,100
[45] Date of Patent: Jan. 4, 2000

[54] CABLE CLIP ASSEMBLIES AND METHODS FOR THEIR USE

[76] Inventor: James A. Merritt, P.O. Box 206, Pleasanton, Calif. 94566

[21] Appl. No.: 09/072,372

[22] Filed: May 4, 1998

[51] Int. Cl.[7] .................................................. F16L 3/08
[52] U.S. Cl. ............................................. 248/74.5; 248/71
[58] Field of Search ................. 248/74.5, 74.1, 248/71, 67.5, 546, 547

[56] References Cited

U.S. PATENT DOCUMENTS

| | | | |
|---|---|---|---|
| 2,961,210 | 11/1960 | Pfaff et al. ............................. | 248/71 X |
| 3,199,816 | 8/1965 | Weisz ....................................... | 248/71 |
| 3,491,972 | 1/1970 | Townshend ............................... | 248/71 |
| 3,951,367 | 4/1976 | Hagelberg ................................ | 248/71 |
| 4,588,152 | 5/1986 | Ruehl et al. ....................... | 248/74.5 X |
| 4,903,920 | 2/1990 | Merritt ..................................... | 248/71 |
| 4,903,921 | 2/1990 | Logsdon ................................. | 248/74.5 |
| 5,054,741 | 10/1991 | Ismert ................................... | 248/74.5 |
| 5,411,228 | 5/1995 | Morawa et al. ....................... | 248/74.5 |
| 5,615,852 | 4/1997 | Heidorn et al. ....................... | 248/74.5 |
| 5,669,589 | 9/1997 | Janssen et al. ........................... | 248/65 |
| 5,739,474 | 4/1998 | Bradley .................................. | 174/135 |

FOREIGN PATENT DOCUMENTS

| | | | |
|---|---|---|---|
| 1077284 | 3/1960 | Germany ................................. | 248/71 |
| 1206504 | 12/1965 | Germany ................................. | 174/157 |
| 1315952 | 5/1976 | United Kingdom ................. | 248/74.5 |
| 2099289 | 12/1982 | United Kingdom ..................... | 248/62 |
| 85/03560 | 8/1985 | WIPO ...................................... | 248/71 |

OTHER PUBLICATIONS

Photocopy of a Tower Plastic Clip Package.
Selecting Cable Clips article from Communications Technology, Apr. 1986, p. 81.
M&B Mfg. Co. New M&B Aluminum Cable Clip Product Brochure.

*Primary Examiner*—Ramon O. Ramirez
*Assistant Examiner*—Anita M. King
*Attorney, Agent, or Firm*—Townsend and Townsend and Crew LLP

[57] ABSTRACT

The present invention provides clip assemblies and methods for their use for retaining a cable against a mounting surface. Exemplary clip assemblies (10) include a clip body (12) having upper and lower surfaces (14, 16). The clip body lower surface defines a cable retaining opening (36) sized for receipt of the cable. The clip body further includes a penetration region that is adapted for being penetrated by a fastener (40). The clip assembly includes a threaded fastener having a head (42), a tip (44), and a shaft portion (46) between the head and tip. The shaft portion has a threaded region (48) and a non-threaded region (54). The threaded region includes a plurality of threads (50) defining a root diameter (52) of the threaded region. The non-threaded region has a diameter (56) that is generally equal to or less than the root diameter of the threaded region. The non-threaded region is adapted to align with the penetration region when the threaded region is fastened to the mounting surface.

17 Claims, 2 Drawing Sheets

CABLE CLIP ASSEMBLIES AND METHODS FOR THEIR USE

BACKGROUND OF THE INVENTION

The present invention relates to clip assemblies that retain cables, such as coaxial cables, against a mounting surface.

Clips for retaining cables against a mounting surface are known in the art. Typically such clips are used to retain television or telephone cables against a mounting surface such as a floor, a wall, or a roof surface. The clip is generally attached by driving a nail through a hole in the clip and into the mounting surface.

In the prior art, clips typically are made from plastic or a deformable metal. As a result, such clips are susceptible to being damaged and chipped as a result of the hammering required to drive the nail into the mounting surface to retain the cable thereto. In addition, the cable itself may be damaged by the hammer's blow.

In an attempt to overcome some of these problems, some cable clips use threaded screws to hold the clip to the mounting surface, thereby avoiding the need to hammer. While the use of screws reduces the likelihood that the cable clip or cable will be damaged by a hammer, the use of screws presents a different set of potential problems. For example, when the screw enters the mounting surface, torque must be applied in order to screw the screw into the mounting surface. Further, the screw threads typically remain in frictional contact with the cable clip, thereby necessitating the use of additional torque to continue to turn the screw. The frictional forces between the threaded screw and the clip also can cause the clip to bend or deform as the screw is turned. Such a deformation of the clip can weaken or damage the clip, and possibly damage the cable being mounted to the mounting surface.

SUMMARY OF THE INVENTION

The present invention provides clip assemblies and methods for their use that address at least some of the problems in the art. The clip assemblies of the present invention use fasteners having a shaft portion with a threaded region as well as a non-threaded region. Compared to a fully-threaded fastener, the fastener of the present invention is configured to reduce the frictional forces between the clip and the fastener when the fastener is being screwed into the mounting surface. At the same time, the clip assembly firmly secures the cable to the mounting surface. In this manner, the present invention helps avoid the potential for damage to the clip assembly and/or the cable from a hammer, and reduces the frictional forces between the fastener and the clip body when the fastener is being screwed into the mounting surface. Reducing the frictional forces between the fastener and clip body in turn reduces the likelihood of clip or cable deformation and makes the fastener easier to turn.

The present invention provides an exemplary clip assembly for retaining a cable against a mounting surface that includes a threaded fastener having a head, a tip, and a shaft portion between the head and tip. The shaft portion of the threaded fastener has a threaded region and a non-threaded region. The threaded region has a plurality of threads defining a root diameter of the threaded region. The non-threaded region has a diameter that is generally equal to or less than the root diameter of the threaded region. The clip assembly further includes a clip body having an upper surface, a lower surface and a body length. The clip body preferably comprises aluminum; however, other materials may be used within the scope of the invention, such as plastics or other metals. The clip body lower surface defines a cable retaining opening sized for receipt of the cable. The clip body further includes a penetration region that is adapted for being penetrated by the fastener.

The clip assembly of the present invention may be used to retain a cable against a mounting surface by placing a cable against the mounting surface and placing the cable retaining opening of the clip assembly against the cable. The threaded fastener is then screwed through the clip body penetration region and into the mounting surface. The threaded fastener is configured so that the threaded region of the fastener preferably creates a threaded hole in the penetration region of the fastener. As the threaded fastener is screwed into the mounting surface, the non-threaded portion of the threaded fastener becomes aligned with the penetration region when the fastener head is in contact with the clip body upper surface. In this manner, the non-threaded region, which has a diameter that is generally equal to or less than the root diameter of the threaded region, is able to spin generally freely within the penetration region. This allows the fastener to be tightened into the mounting surface while the fastener head contacts the clip body upper surface, thereby providing for the secure mounting of the cable with a reduced amount of torque needed to overcome frictional forces between the clip and the fastener.

In one aspect, the clip assembly clip body upper surface defines a first slot, having a first slot bottom and a first slot depth, and the clip body lower surface further defines a second slot, having a second slot bottom and a second slot depth. The first and second slot bottoms define a separation wall therebetween, having a slot separation wall thickness. In such an arrangement, the slot separation wall defines the penetration region. The threaded fastener tip may then be driven through the slot separation wall and the fastener may be screwed into and through the slot separation wall and into the mounting surface as previously described. By creating first and second slots in this manner, the fastener is screwed through a smaller portion of the clip body than it would be if the clip body did not have such first and second slots.

In one aspect, the root diameter is between about 0.050 inch and about 0.150 inch. The threaded fastener non-threaded region preferably is located adjacent the fastener head and the threaded region preferably is located adjacent the fastener tip. In one aspect, the non-threaded region has a length that generally is equal to or greater than the sum of the first slot depth and the slot separation wall thickness. In this manner, the non-threaded region is aligned with the clip body penetration region when the fastener head is in contact with the clip body upper surface.

The threaded fastener is preferably initially constricted within the slot separation wall as a result of the fastener tip being driven therethrough. The clip-fastener combination is preferably how the clip assembly is provided to the user. The user may place the clip over the cable or conduit and then screw the threaded fastener through the slot separation wall and into the mounting surface. The threaded fastener is preferably screwed into the mounting surface until the fastener head comes in contact with the upper surface of the clip body. At this time the fastener can continue to be threaded into the mounting surface to ensure the clip is secured tightly against the mounting surface.

In one aspect, the fastener tip comprises a drill saw tip, although other types of fastener tips may be used within the scope of the present invention. In this manner, the tip may be driven into the clip body penetration region. In another aspect, the slot separation wall has a thickness that preferably is between about 0.02 inch and about 0.04 inch.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
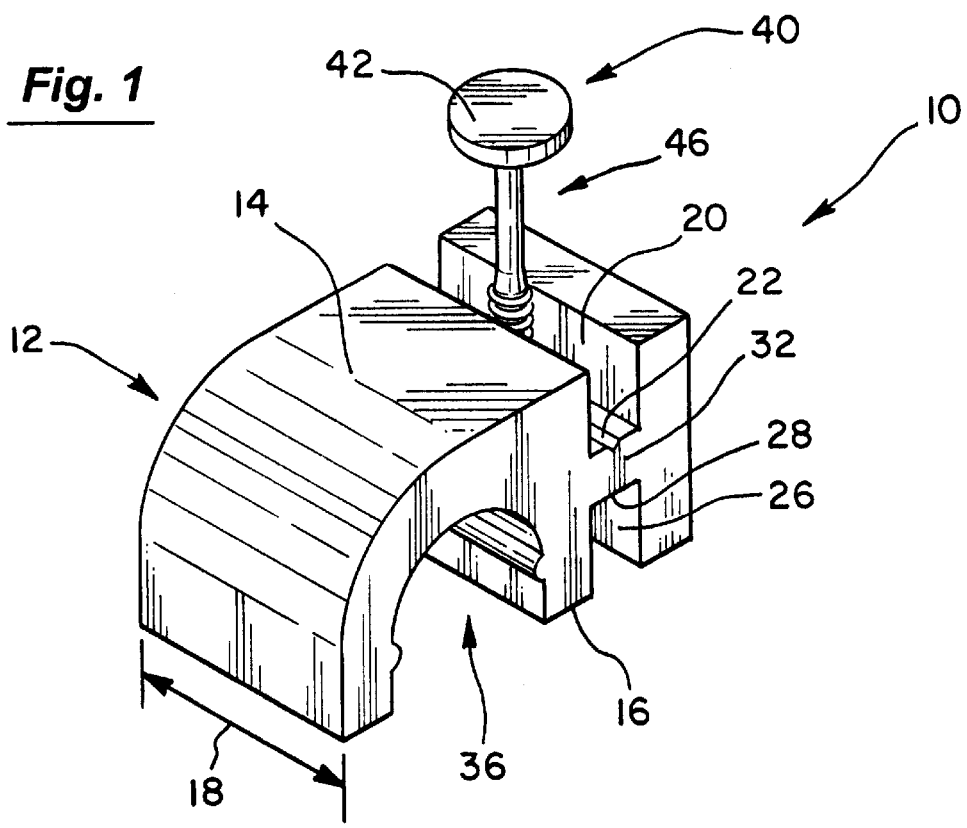
FIG. 1 is an isometric view of a clip assembly according to the present invention showing a threaded fastener and a clip body.

FIG. 1 depicts a clip assembly 10 according to the present invention. Clip assembly 10 comprises a clip body 12 having an upper surface 14, a lower surface 16, and a body length 18. Clip body 12 is preferably formed by an extrusion process. Extruding the cable clip from metal, such as aluminum, produces a clip which is weather-resistant, has great strength and is resistant to damage by hammering. Extruding clip body 12 further allows easy adjustment of body length 18 by cutting the extruded clip to the desired length. Clip body 12 and its uses are further described in U.S. Pat. No. 4,903,920, the complete disclosure of which is hereby incorporated by reference.

Clip body upper surface 14 defines a first slot 20 having a first slot bottom 22. Clip body lower surface 16 defines a second slot 26 having a second slot bottom 28. First and second slot bottoms 22, 28 define a slot separation wall 32. For the embodiment depicted in FIG. 1, slot separation wall 32 defines the penetration region for a threaded fastener 40.

Figure 2:
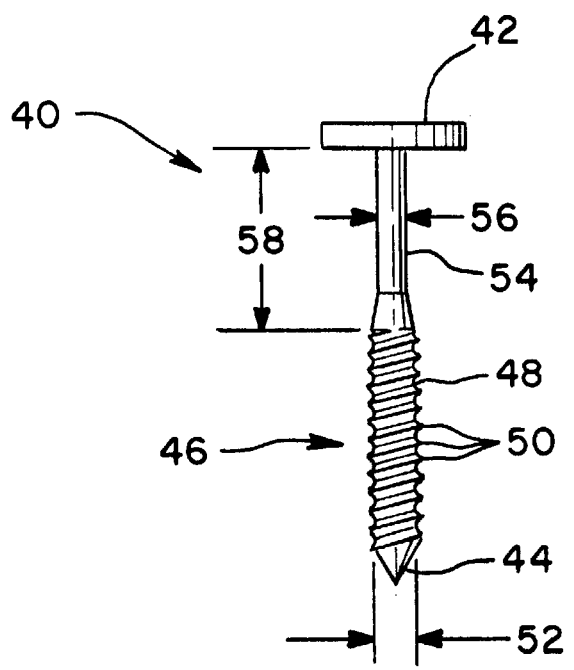
FIG. 2 is an end view of the threaded fastener as part of the clip assembly depicted in FIG. 1.

As best shown in FIG. 2, threaded fastener 40 includes a head 42, a tip 44 and a shaft portion 46 between head 42 and tip 44. Shaft portion 46 is divided into a threaded region 48 and a non-threaded region 54. Threaded region 48 includes a plurality of threads 50 having a root diameter 52. Non-threaded region 54 has a non-threaded region diameter 56 that is generally equal to or less than root diameter 52 of threaded region 48. By providing non-threaded region 54 with diameter 56 that is equal to or less than threaded region root diameter 52, threaded fastener 40 can be more easily screwed into and through separation wall 32, as described in further detail in the following figures. Non-threaded region 54 has a non-threaded region length 58 that is adapted to align at least a portion of non-threaded region 54 with slot separation wall 32 when threaded fastener head 42 contacts clip body upper surface 14.

Figure 3:
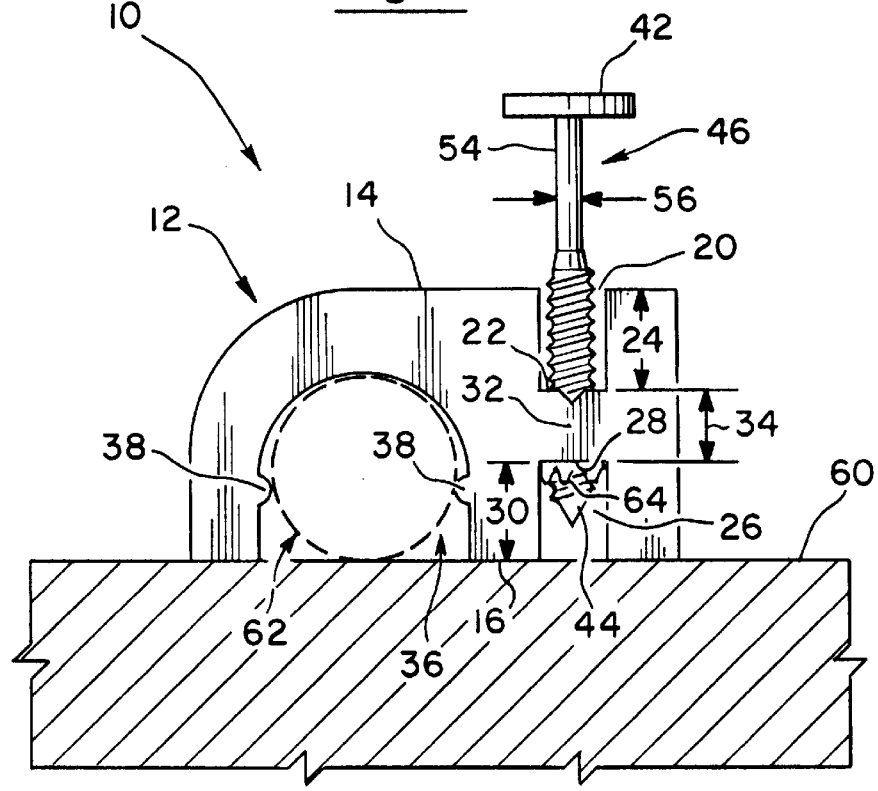
FIG. 3 is an end view of the clip assembly depicted in FIG. 1.
Figure 4:
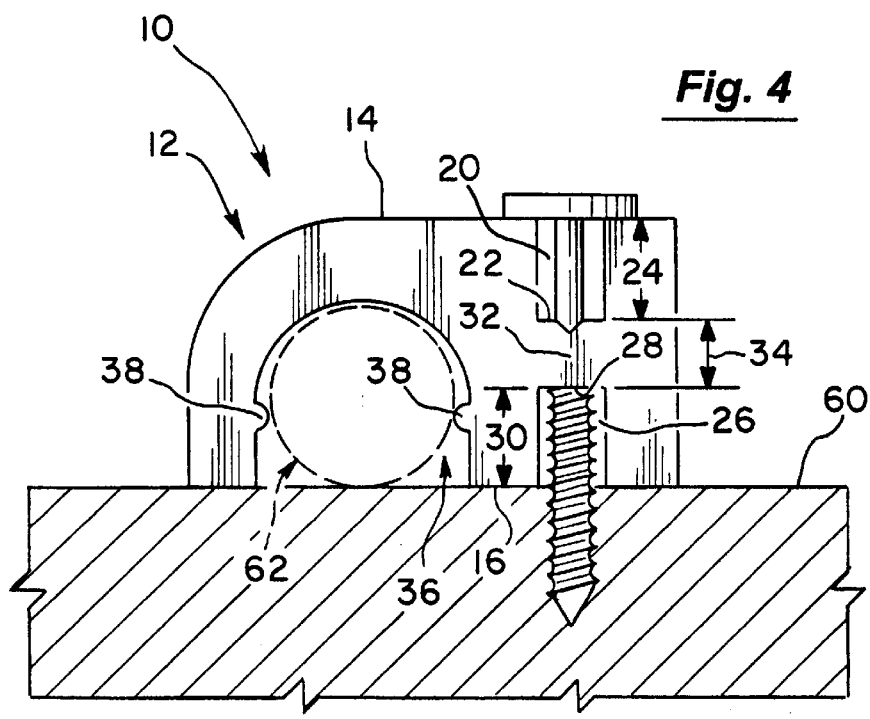
FIG. 4 is an end view of the clip assembly depicted in FIGS. 1 and 3, showing the threaded fastener head engaging the upper surface of the clip body.

Turning now to FIGS. 3 and 4, the operation of threaded fastener 40 in conjunction with clip body 12 will be further described. Clip body lower surface 16 defines a cable retaining opening 36 that is adapted to receive a cable 62 to be mounted to a mounting surface 60. Cable retaining opening 36 may further include at least one ridge 38 to assist with the retention of cable 62 within cable retaining opening 36. Clip body 12 has a penetration region to receive fastener 40. As shown in FIGS. 3 and 4, the penetration region is slot separation wall 32. Slot separation wall 32 is adapted to be penetrated by threaded fastener tip 44. However, it will be appreciated that the penetration region could be a portion of clip body 12 that does not have slots 20 and 26. Threaded fastener tip 44 preferably is threaded or driven through slot separation wall 32 in a manner which constricts threaded fastener 40 within slot separation wall 32. In this manner, clip assembly 10 can be sold having threaded fastener 40 already fitted within the desired penetration region in clip body 12, such as within slot separation wall 32.

In use, clip body 12 is positioned against surface 60 with cable 62 within opening 36 as shown in FIG. 3. Threaded fastener 40 is screwed into and through slot separation wall 32. As tip 44 penetrates through slot separation wall 32 and into second slot 26, a flashing 64 may be created. Flashing 64 comprises a portion of slot separation wall 32 that is driven out through a threaded hole (not shown) created by threaded fastener 40 as tip 44 passes through slot separation wall 32 and into second slot 26. Tip 44 then enters mounting surface 60 and threads 50 of threaded portion 48 carve out a threaded hole in mounting surface 60. As a result, threaded fastener 40 is pulled into mounting surface 60 until fastener head 42 contacts clip body upper surface 14 as shown in FIG. 4. At this point, fastener 40 can continue to be turned, and doing so tightens clip body 12 against surface 16 without an undue torque being applied to clip body 12. This is because in the position of FIG. 4, threads 50 are no longer in wall 32; rather, non-threaded region 54 passes through the hole formed in wall 32 by threaded region 48 SO fastener 40 spins generally freely.

As can be appreciated, threads 50 of threaded fastener 40 experience frictional resistance as threads 50 pass through slot separation wall 32 and into mounting surface 60. If threaded fastener 40 comprised a fully threaded fastener without non-threaded region 54, the fastener would have a threaded region impacting both slot separation wall 32 and mounting surface 60, with increased resistance as fastener 40 was screwed into mounting surface 60. In addition to providing additional resistance, therefore making fastener 40 more difficult to screw, additional frictional forces may bend clip body 12, causing first slot 20 to be constricted. Likewise, if threaded fastener 40 had a non-threaded region 54 adjacent head 42 that had a diameter as large as threads 50, non-threaded region 54 would experience frictional drag as it entered the threaded hole bored out by threaded region 48. Therefore, at least part of the present invention involves the realization that the use of non-threaded region 54 having diameter 56 that is generally equal to or less than root diameter 52 of threaded region 48 allows threaded fastener 40 to experience reduced frictional forces in slot separation wall 32 as fastener 40 is screwed into mounting surface 60.

By providing non-threaded region 54 with diameter 56 generally equal to or less than root diameter 52, non-threaded region 54 spins generally freely within slot separation wall 32 as threaded region 48 is screwed into mounting surface 60. Non-threaded region 54 preferably is located adjacent head 42. In such an arrangement, non-threaded region 54 has a length that is equal to or greater than the sum of a first slot depth 24 and a slot separation wall thickness 34. As shown in FIG. 4, this results in non-threaded region 54 extending at least to second slot bottom 28, and preferably into second slot 26. Threaded region 48 then has a length that is about equal to or greater than a second slot depth 30 to allow at least a portion of threaded region 48 to enter mounting surface 60, thereby facilitating the secure mounting of clip assembly 10 to mounting surface 60. It will be appreciated that non-threaded region 54 need not be adjacent head 42, but may be located elsewhere along shaft portion 46. For example, non-threaded region 54 may be in the middle of shaft portion 46, provided at least a portion of non-threaded region 54 is adapted to align with the clip body penetration region when head 42 contacts clip body 12.

The invention has now been described in detail. However, it will be appreciate that certain changes and modifications may be made. Therefore, the scope and content of this invention are not limited by the foregoing description; rather, the scope and content are to be defined by the following claims.

What is claimed is:

1. A clip assembly for retaining a cable against a mounting surfaces comprising:

a threaded fastener having a head, a tip and a shaft portion between said head and tip;

said shaft portion having a threaded region and a non-threaded region, said threaded region having a plurality of threads defining a root diameter, said non-threaded region having a diameter that is generally equal to or less than the root diameter of said threaded region;

a clip body having an upper surface, a lower surface and a body length;

said lower surface defining a cable retaining opening sized for receipt of the cable;

said clip body having a penetration region that is adapted for being penetrated by said fastener tip; and wherein said threaded region is adapted to carve out a threaded hole in said penetration region and said non-threaded region is adapted to spin generally freely in said threaded hole.

2. A clip assembly as in claim 1, wherein said non-threaded region is positioned to be aligned with said penetration region when said fastener head is in contact with said clip body.

3. A clip assembly as in claim 1, wherein said root diameter is between about 0.050 inch and about 0.150 inch.

4. A clip assembly as in claim 1, wherein said clip body upper surface defines a first slot having a first slot bottom and a first slot depth;

said clip body lower surface defines a second slot having a second slot bottom and a second slot depth; and said first and second slot bottoms define a slot separation wall therebetween having a slot separation wall thickness.

5. A clip assembly as in claim 4, wherein said penetration region comprises said slot separation wall.

6. A clip assembly as in claim 4, wherein said non-threaded region is located adjacent said head and said non-threaded region has a length that is generally equal to or greater than the sum of said first slot depth and said slot separation wall thickness.

7. A clip assembly for retaining a cable against a mounting surface, comprising:

a threaded fastener having a head, a tip and a shaft portion between said head and tip;

said shaft portion having a threaded region and a non-threaded region, said threaded region having a plurality of threads defining a root diameter, said non-threaded region having a diameter that is generally equal to or less than the root diameter of said threaded region;

a clip body having an upper surface, a lower surface and a body length;

said upper surface defining a first slot having a first slot bottom and a first slot depth;

said lower surface defining a cable retaining opening sized for receipt of the cable;

said lower surface further defining a second slot having a second slot bottom and a second slot depth, said first and second slot bottoms defining a slot separation wall therebetween having a slot separation wall thickness;

said threaded fastener being constricted within said slot separation wall as a result of said fastener tip being driven therethrough and wherein said threaded region is adapted to carve out a threaded hole in said slot separation wall; and said non-threaded region positioned to be aligned with said slot separation wall when said fastener head is in contact with said clip body so that said non-threaded region spins generally freely within said threaded hole.

8. A clip assembly as in claim 7, wherein said threaded region is located adjacent said tip and said non-threaded region is located adjacent said head.

9. A clip assembly as in claim 8, wherein said non-threaded region has a length that is generally equal to or greater than the sum of said first slot depth and said slot separation wall thickness.

10. A clip assembly as in claim 7, wherein said fastener tip comprises a drill saw tip.

11. A clip assembly as in claim 7, wherein said slot separation wall has a thickness that is between about 0.020 inch and about 0.040 inch.

12. A clip assembly as in claim 7, wherein said clip body comprises aluminum.

13. A clip assembly as in claim 7, wherein said root diameter is between about 0.050 inch and about 0.150 inch.

14. A method for retaining a cable against a mounting surface comprising the steps of:

providing a cable;

providing a clip assembly comprising:

a threaded fastener having a head, a tip and a shaft portion between said head and tip, said shaft portion having a threaded region adjacent said tip and a non-threaded region adjacent said head, said threaded region having a plurality of threads defining a root diameter, said non-threaded region having a diameter that is generally equal to or less than the root diameter of said threaded region; and a clip body having an upper surface, a lower surface and a body length;

said upper surface defining a first slot having a first slot bottom;

said lower surface defining a cable retaining opening sized for receipt of the cable;

said lower surface further defining a second slot having a second slot bottom, said first and second slot bottoms defining a slot separation wall therebetween; and said threaded fastener being constricted within said slot separation wall as a result of said fastener tip being driven therethrough;

placing said cable against said mounting surface;

placing said cable retaining opening against said cable;

screwing said threaded region of said fastener through said slot separation wall and into said mounting surface to retain said cable to said mounting surface;

wherein said screwing step carves out a threaded hole in said slot separation wall; and wherein said non-threaded portion spins generally freely in said threaded hole to allow said head to engage said clip body upper surface.

15. A method as in claim 14, wherein said screwing step comprises screwing said threaded fastener through said slot separation wall and into said mounting surface until said head engages said clip body upper surface; and continuing to screw said threaded fastener into said mounting surface while said non-threaded portion is at least coextensive with said slot separation wall.

16. A clip assembly for retaining a cable against a mounting surface, comprising:

a threaded fastener having a head, a tip and a shaft portion between said head and tip;

said shaft portion having a threaded region and a non-threaded region, said threaded region having a plurality of threads defining a root diameter, said non-threaded region having a diameter that is generally equal to or less than the root diameter of said threaded region;

a clip body having an upper surface, a lower surface and a body length;

said lower surface defining a cable retaining opening sized for receipt of the cable;

said clip body having a penetration region that is adapted for being penetrated by said fastener tip;

said clip body upper surface defines a first slot having a first slot bottom and a first slot depth;

said clip body lower surface defines a second slot having a second slot bottom and a second slot depth;

said first and second slot bottoms define a slot separation wall therebetween having a slot separation wall thickness; and wherein said non-threaded region is located adjacent said head and said non-threaded region has a length that is generally equal to or greater than the sum of said first slot depth and said slot separation wall thickness.

17. A clip assembly for retaining a cable against a mounting surface, comprising:

a threaded fastener having a head, a tip and a shaft portion between said head and tip;

said shaft portion having a threaded region and a non-threaded region, said threaded region having a plurality of threads defining a root diameter, said non-threaded region having a diameter that is generally equal to or less than the root diameter of said threaded region;

a clip body having an upper surface, a lower surface and a body length;

said upper surface defining a first slot having a first slot bottom and a first slot depth;

said lower surface defining a cable retaining opening sized for receipt of the cable;

said lower surface further defining a second slot having a second slot bottom and a second slot depth, said first and second slot bottoms defining a slot separation wall therebetween having a slot separation wall thickness;

said threaded fastener being constricted within said slot separation wall as a result of said fastener tip being driven therethrough;

said non-threaded region positioned to be aligned with said slot separation wall when said fastener head is in contact with said clip body;

said threaded region is located adjacent said tip and said non-threaded region is located adjacent said head; and wherein said non-threaded region has a length that is generally equal to or greater than the sum of said first slot depth and said slot separation wall thickness.

* * * * *